United States Patent [19]

Bjorklund et al.

[11] Patent Number: 4,731,755
[45] Date of Patent: Mar. 15, 1988

[54] THERMAL DESIGN FOR REVERSIBLE PHASE CHANGE OPTICAL STORAGE MEDIA

[75] Inventors: Gary C. Bjorklund, Los Altos; Martin Y. Chen; Victor B. Jipson, both of San Jose, all of Calif.

[73] Assignee: International Business Machines Corporation, New York, N.Y.

[21] Appl. No.: 849,988

[22] Filed: Apr. 10, 1986

[51] Int. Cl.[4] .............................................. G11C 13/00
[52] U.S. Cl. .................................... 365/127; 365/120; 346/135.1; 369/284
[58] Field of Search .............................. 365/127, 120; 346/135.1; 369/284

[56] References Cited

U.S. PATENT DOCUMENTS

| | | | |
|---|---|---|---|
| 3,530,441 | 9/1970 | Ovshinsky | 340/173 |
| 3,778,785 | 12/1973 | von Gutfeld | 340/173 |
| 4,298,975 | 11/1981 | van der Veen | 365/124.4 R |
| 4,363,844 | 12/1982 | Lewis et al. | 428/65 |
| 4,408,213 | 10/1983 | Bell | 365/127 |
| 4,422,159 | 12/1983 | Craighead et al. | 365/127 |

Primary Examiner—Terrell W. Fears
Attorney, Agent, or Firm—Joseph G. Walsh

[57] ABSTRACT

Reversible phase change storage material is thermally isolated in a storage medium by means of grooves in the substrate and at least one layer of a thermally conductive dielectric material.

3 Claims, 4 Drawing Figures

THERMAL DESIGN FOR REVERSIBLE PHASE CHANGE OPTICAL STORAGE MEDIA

DESCRIPTION

1. Technical Field

The present invention deals with optical storage media having improved thermal designs. In particular, the present invention deals with reversible phase change systems.

2. Background Art

Optical storage systems are well known to the art. See for example U.S. Pat. No. 3,530,441.

U.S. Pat. No. 3,3778,785 teaches the importance of rapid thermal quenching in order to achieve reverse mode writing in phase change materials. (Reverse mode writing refers to using crystalline to amorphous transistions for data recording and amorphous to crystalline transitions for erasing.)

U.S. Pat. No. 4,298,975 discloses pit formation in an organic recording layer.

U.S. Pat. No. 4,363,844 shows grooves of about 1,000 Angstrom units in read-only disks. The grooves of the present invention are much deeper than those.

DISCLOSURE OF THE INVENTION

According to the present invention, reduced erase energy and reduced thermal cross-talk are achieved in a reversible phase change optical storage medium by an improved thermal design. In the present invention, the optical storage medium comprises a substrate having lands and grooves. Above this substrate is an active layer of reversible phase change material in which the actual storage takes place. In addition, the optical storage medium comprises at least one thermally conductive dielectric layer, either between said substrate and said active layer or on top of said active layer. The grooves in the substrate are of sufficient depth so that they provide thermal isolation between adjacent lands and grooves.

DRAWINGS

A better understanding of the present invention may be obtained by reference to the accompanied drawings. The drawings are not to scale and are diagrammatic.

Turning again to FIG. 1, it is seen that the substrate is provided with lands and grooves and that the grooves are sufficiently deep so that there is no contact between the active layer material on adjacent lands and grooves. This provides thermal isolation.

Figure 2A:
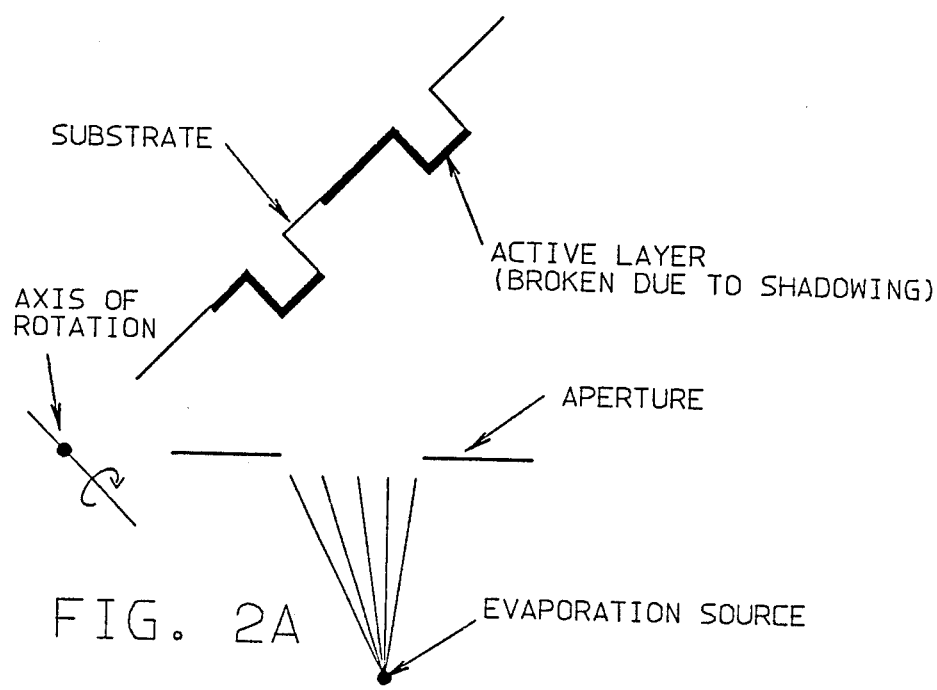
FIGS. 2A and 2B show alternate processes for preparing storage media according to the present invention.
Figure 2B:
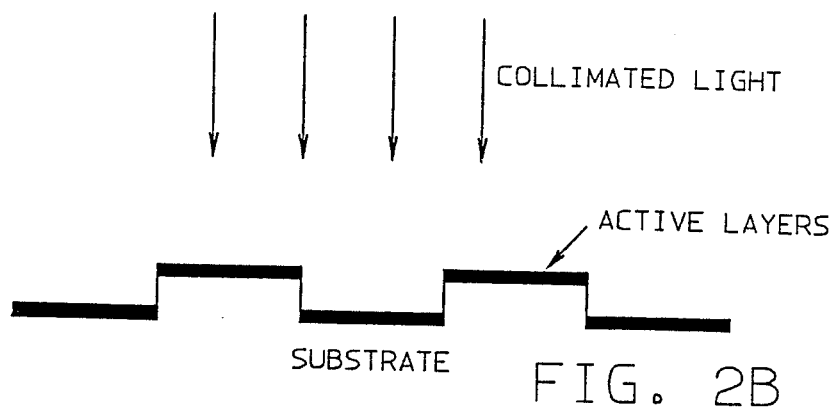

FIG. 2A illustrates an angular deposition scheme in which the shadows cast by the "land" regions in the pregrooved substrate serve to break the continuity of the high thermal conductivity layers as well as of the recording active layers. The angle of deposition with respect to the grooves is held constant over the entire disk surface by performing the deposition through a fixed sector shaped mark while the disk itself is rotated. This scheme has the advantage of tolerance to poorly collimated deposition sources, but has the disadvantage of coating one "wall" in addition to the "land". FIG. 2B illustrates an alternate scheme that can be utilized if well collimated deposition sources are available. Deposition is performed exactly at normal incidence. Rotation of the disk and use of mask are optional. Both the "grooves" and "lands" will be coated, but the vertical "walls" will be free of material.

Figure 1:
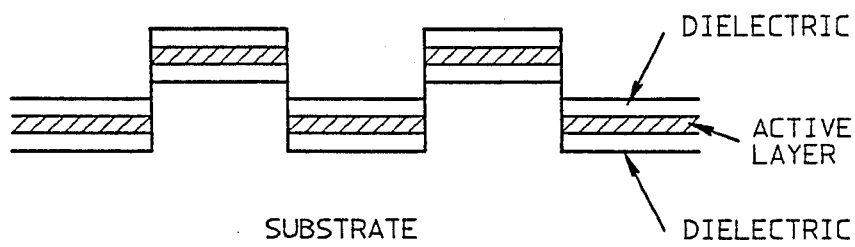
FIG. 1 is a cross-section of a typical optical storage medium according to the present invention.
Figure 3:
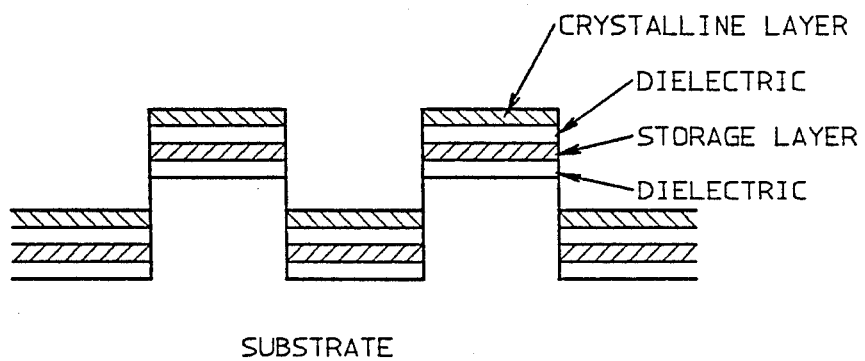
FIG. 3 shows one preferred variation of the present invention.

FIG. 3 is similar to FIG. 1 except that an additional layer, namely a crystalline layer, has been placed on top of the top dielectric layer. This will be discussed below.

When adjacent tracks of the recording active layer are thermally isolated, as they are in the present invention, there is achieved a minimization of deleterious radial heat flow. More efficient erasing is provided and there is minimized thermally induced crystallization of adjacent tracks. The breaking of the continuity prevents crystalline regions in one track from nucleating recrystallization of adjacent tracks. Furthermore, the thermally conductive dielectric layer provides a sink for the writing energy and thereby makes possible the rapid thermal quenching required during amorphizing during writing. During erasing, which is a slower process, there is sufficient time for heat to be conducted to and stored in the dielectric and the crystalline layers. This stored energy prevents the active layer from cooling rapidly at the conclusion of the erase pulse and, thereby, effectively stretches the erase pulse.

In summary, according to the present invention, tracking grooves are utilized to minimize radial heat flow by effectively isolating adjacent tracks of the recording active layer. At the same time, to insure that rapid thermal quenching is still achieved for recording, the active layer is surrounded by enough high thermal conductivity material to provide the same for the recording process. Through proper selection of the thermal mass of these adjacent layers, the rapid quenching is achieved.

Returning again to FIG. 3, a crystalline material with a melting point at the desired recrystallization temperature is located over the top dielectric layer. During the writing process, this crystalline layer is inactive but during erasure this layer acts to store excess energy (heat of melting) and then release the energy, having the effect of stretching the erase pulse duration.

Typically, the substrate is made of polymeric material, particularly polymethylmethacrylate, polycarbonate or any photopolymer material. The active layer, i.e. the material in which storage actually takes place, may be any of many materials known to the art, for example, see U.S. patent application, Ser. No. 06/766,160, filed Aug. 15, 1985, where many such materials are listed. Preferred materials include, for example, $(TeGe)_{85}Sn_{15}$, $(TeGe)_{1-x}Sn_x$, GeTe and $SB_2Se$. For use the thermally conductive dielectric material, silicon dioxide is a preferred material. Other useful materials include, for example, $Al_2O_3$, $ZrO_2$, $Si_3N_4$, AlN and ZnO.

The active layer is usually about 1,000 Angstroms in thickness. The dielectric layers are usually from 1,000 to 2,000 Angstroms in thickness with the entire system including the grooves being so designed that thermal isolation between adjacent lands and grooves is achieved.

For use as the crystalline layer shown in FIG. 3, preferred materials include Te, $Sb_2Te_3$, $Bi_2Te_3$ and $AuTe_2$.

What is claimed is:

1. An optical storage medium comprising a substrate having lands and grooves, a reversible phase change active layer approximately 1,000 Angstroms thick above said substrate, and at least one thermally conductive dielectric layer, between 1,000 and 2,000 Angstroms thick either between said substrate and said active layer or on top of said active layer, with the grooves in the substrate being of at least 5,000 Angstroms in depth to provide thermal isolation between adjacent lands and grooves.

2. An optical storage medium as claimed in claim 1 wherein there are two layers of thermally conductive dielectric material, one layer above and one layer below the active layer.

3. An optical storage medium as claimed in claim 1 wherein the thermally conductive dielectric layer on top of the active layer is covered by a layer of crystalline material.

* * * * *